United States Patent
Ganesan et al.

(10) Patent No.: US 12,522,854 B2
(45) Date of Patent: Jan. 13, 2026

(54) SYSTEMS, DEVICES AND METHODS FOR DETERMINING MOST PROBABLE NUMBER IN BIOLOGICAL SAMPLE ANALYSIS

(71) Applicant: Ancera, Inc., Branford, CT (US)

(72) Inventors: Arjun Ganesan, Newington, CT (US); John C. Voyta, Berlin, MA (US)

(73) Assignee: Ancera, Inc., Branford, CT (US)

(*) Notice: Subject to any disclaimer, the term of this patent is extended or adjusted under 35 U.S.C. 154(b) by 402 days.

(21) Appl. No.: 18/022,429

(22) PCT Filed: Aug. 20, 2021

(86) PCT No.: PCT/US2021/046997
§ 371 (c)(1),
(2) Date: Feb. 21, 2023

(87) PCT Pub. No.: WO2022/040589
PCT Pub. Date: Feb. 24, 2022

(65) Prior Publication Data
US 2023/0332202 A1    Oct. 19, 2023

Related U.S. Application Data

(60) Provisional application No. 63/068,884, filed on Aug. 21, 2020.

(51) Int. Cl.
*C12Q 1/06* (2006.01)
(52) U.S. Cl.
CPC ..................... *C12Q 1/06* (2013.01)
(58) Field of Classification Search
CPC ........................................................ C12Q 1/06
See application file for complete search history.

(56) References Cited

U.S. PATENT DOCUMENTS

| | | |
|---|---|---|
| 8,961,878 B2 | 2/2015 | Koser |
| 9,999,855 B2 | 6/2018 | Koser |
| 10,302,634 B2 | 5/2019 | Koser |
| 10,632,463 B2 | 4/2020 | Koser |
| 11,204,350 B2 | 12/2021 | Koser |

(Continued)

FOREIGN PATENT DOCUMENTS

| | | |
|---|---|---|
| AU | 2017202597 B2 | 8/2019 |
| WO | 2014144340 A1 | 9/2014 |

(Continued)

OTHER PUBLICATIONS

Anonymous: "Most Probable Number (MPN) Test: Principle, Procedure and Results—Learn Microbiology Online" www.web.archive.org (Jul. 22, 2020).

(Continued)

*Primary Examiner* — Yong D Pak
(74) *Attorney, Agent, or Firm* — Myers Bigel, P.A.

(57) ABSTRACT

Embodiments of the present disclosure include systems, devices and methods for increasing the accuracy of an MPN, using assay instrumentation. For example, such embodiments can be accomplished by pre-loading the assays system with standard curves generated from measurements made with dilutions of known levels of pathogens. When such an approach is used, for each sample, the value from the last positive dilution and a calibrated assay count can both be used to provide a more accurate CFU per sample value than would be determined from just the last positive dilution alone.

26 Claims, 4 Drawing Sheets

(56) References Cited

U.S. PATENT DOCUMENTS

| | | |
|---|---|---|
| 11,285,490 B2 | 3/2022 | Koser |
| 11,383,247 B2 | 7/2022 | Koser |
| 2019/0091699 A1 | 3/2019 | Koser |
| 2020/0306758 A1 | 10/2020 | Dhlakama |

FOREIGN PATENT DOCUMENTS

| | | |
|---|---|---|
| WO | 2014144782 A2 | 9/2014 |
| WO | 2014144810 A1 | 9/2014 |
| WO | 2014145765 A1 | 9/2014 |
| WO | 2014165317 A1 | 10/2014 |
| WO | 2016210348 A2 | 12/2016 |
| WO | 2017004595 A1 | 1/2017 |
| WO | 2017192633 A1 | 11/2017 |
| WO | 2018026605 A1 | 2/2018 |
| WO | 2019103741 A1 | 5/2019 |
| WO | 2019117877 A1 | 6/2019 |
| WO | 2022015845 A2 | 1/2022 |
| WO | 2023183598 A1 | 9/2023 |

OTHER PUBLICATIONS

International Search Report and the Written Opinion of the International Searching Authority corresponding to International Patent Application No. PCT/US2021/046997 (12 pages) (mailed Nov. 11, 2021).

Kim et al. "Development of a rapid method to quantify *Salmonella typhimurium* using a combination of MPN with qPCR and a shortened time incubation" Food Microbiology, 65:7-18 (2017).

Puttaswamy et al. "Rapid detection of bacterial proliferation in food samples using microchannel impedance measurements at multiple frequencies" Sensing and Instrumentation for Food Quality and Safety, 4:108-118 (2010).

SYSTEMS, DEVICES AND METHODS FOR DETERMINING MOST PROBABLE NUMBER IN BIOLOGICAL SAMPLE ANALYSIS

RELATED APPLICATIONS

The current disclosure is a U.S. National Stage Entry of International Patent Application No. PCT/US2021/046997, filed Aug. 20, 2021, which claims benefit of and priority to U.S. provisional application No. 63/068,884, filed Aug. 21, 2020, and is also related to U.S. Pat. Nos. 8961878, and 9,999,855, PCT publication nos. WO2014/144340, WO2014/144782, WO2014/144810, WO2014/145765, WO2014/165317, WO2016/210348, WO2017/004595, WO2018/026605, WO2019/117877, WO2019/103741 and PCT application no. PCT/US2021/041616. Each of the foregoing disclosures is incorporated by reference herein in its entirety.

BACKGROUND

Most-probable-number, or MPN, is an approach in microbiology used to determine a number of colony-forming-units (CFUs) of bacteria being present in a sample (i.e., one (1) CFU corresponds to one viable bacteria cell). MPN methods involve, first, preparing a sample (such as a rinsate of poultry parts, a dilution of a ground sample, a dilution of a boot-swab, a dilution of growth area litter, rinse of an environmental swab, etc.), then serially diluting and enriching the sample to increase the pathogen count in each dilution, often in duplicate, triplicate or at higher replicates. In classic MPN analysis, a second set of dilutions and enrichments is performed. The presence or absence result from the series of dilutions after the enrichment period is used to calculate the most probable number of organisms based on statistics.

SUMMARY

Embodiments of the present disclosure present and use automated methods via an assay system, e.g., such Ancera LLC's PIPER™ system ("PIPER"), flow cytometry (cell counts), PCR (cycle times), and/or immunoassay (intensity) in combination with a serial dilution to generate a series of results where the concentration of cells (CFU level) in the original sample can be extrapolated from the dilution factor of at least two (last) positive dilution in the dilution series. In some embodiments, duplicate (or triplicate, and more) dilution sets can be performed.

The PIPER system is an assay system which uses a multi-lane (e.g., 12-lane) microfluidic cartridge and a processing instrument that is used to process a sample(s) loaded into a cartridge (see WO2018026605, herein incorporated by reference). The system uses magnetophoresis to manipulate particles or cells with a ferrofluid in microfluidic channels. The cartridge is arranged within the Piper instrument in close proximity to a printed circuit board (PCB) that generates a magnetic field(s). The ferrofluid is a colloidal suspension of polymer or surfactant stabilized superparamagnetic nanoparticles, which, under the influence of a magnetic field generated by the PCB, as well as a pumping system built into the cartridge, particles or cells and be concentrated or otherwise focused and flowed along a surface of capture zone coated with binders specific for a particular target particle or cell. The PCB power and frequency, as well as the flow rate of the system, can be optimized for specific sized particles or cells for optimal assay performance. The capture zone(s) can be designed with between one and a plurality of capture areas (e.g., eight unique capture areas, or more) depending on the assay format. After capture, the particles or cells can be labeled for fluorescence detection, via, for example, fluorescent DNA intercalating dyes, labeled target specific binders such as labeled antibodies, enzyme substrates specific for intracellular enzymes, and labeled nucleic acid probes that enable fluorescence in-situ hybridization detection of target specific DNA, mRNA or rRNA sequences. The processing instrument (PIPER instrument) can include an optical system that enables detection and counting of fluorophore labeled particles or cells attached to the capture zone. The optics can include a camera and microscope objective along with, for example, a specific LED and/or a filter set that enables excitation and detection of emission of the label fluorophores. The PIPER system can be configured with custom imaging algorithms to facilitate accurate imaging and counting of labeled cells. In addition, each lane of the Piper microfluidic cartridge can at least one of:

contain a sample well and a dye chamber (used to add the specific label to the captured cells); and including one or more target specific capture zones.

In some cases, assays can be designed that do not require particle or cell capture. In such assays, pre-labeled particles or cells are simply pushed to the surface and imaged. The PIPER system is configured such that samples recirculate back to a sample chamber during a pumping cycle. Specifically, the cartridge includes a peristaltic pumping system that is actuated by the PIPER instrument and controls valves to accomplish such recirculation, as well as enable the addition of labeling reagents.

The PCB of PIPER is mated to a stage that controls temperature of the microfluidic cartridge during the assay.

In some embodiments, assay precision can be further improved by using a calibrated count assay at several dilutions to calculate the original quantity.

Calibrated assay counts, according to some embodiments, can be obtained when an assay instrument is pre-loaded (or can be later converted to CFUs from PIPER, in the cloud, a secondary worksheet, and the like) with standard curves generated from the enrichment of samples having known measured CFUs of the assay target resulting in a standard curve that can be used to convert assay counts (in our case PIPER counts) into actual CFU levels in the tested sample. This, according to some embodiments, defines the range of CFU levels over which accurate quantitation can be achieved (dynamic range). The dynamic range of calibrated counts may vary based on the enrichment time. When such a standard curve is loaded into an instrument (or converted to CFUs, e.g., in the cloud, secondary worksheet, and the like), the instrument can display a calibrated count which is proportional to a CFU number in the sample being tested. In this application, we can apply the standard curve to the instrument counts of the last positive dilution to further increase the accuracy of the measurement beyond the number provided solely by the original dilution factor of the sample.

For embodiments of the present disclosure, sample types include (and for example), poultry rinsates, feces, boot swabs, boot socks, feed, grain, carcass swabs, dairy products, water and juice samples, prepared meats, produce, food production samples, and the like.

Accordingly, in some embodiments, a method for quantifying a number of pathogens or microbes present in a food sample in a microfluidic based assay is provided and includes providing a food sample (optional), establishing a first dilution of the food sample by adding a first volume of media serially diluting the first dilution at least one additional time or a plurality of times, and enriching the food sample after each dilution. Subsequent dilutions are increased by a dilution factor, and such dilutions range from between 1 part sample with 1 part media, to 1 part sample with 1000 parts media.

In some embodiments, dilutions range from between:
1 part sample with 1 part media, or 1 part sample with greater than 1 part media,
1 part sample and up to 5 parts media,
1 part sample and up to 6 parts media,
1 part sample and up to 7 parts media,
1 part sample and up to 8 parts media,
1 part sample and up to 9 parts media,
1 part sample and up to 10 parts media,
1 part sample and up to 20 parts media,
1 part sample and up to 25 parts media,
1 part sample and up to 50 parts media,
1 part sample and up to 75 parts media,
1 part sample and up to 100 parts media,
1 part sample and up to 150 parts media,
1 part sample and up to 200 parts media,
1 part sample and up to 300 parts media,
1 part sample and up to 400 parts media,
1 part sample and up to 500 parts media,
1 part sample and up to 600 parts media,
1 part sample and up to 700 parts media,
1 part sample and up to 800 parts media,
1 part sample and up to 900 parts media,
1 part sample and up to 1000 parts media,
1 part sample and up to 5000 parts media,
1 part sample and up to 10000 parts media, and
1 part sample and greater than 10000 parts media.
and ranges between any of the foregoing.

In the method, according to the above-noted embodiments, the plurality of dilutions can be between: 2-3 times, 2-4 times, 2-5 times, 2-6 times, 2-7 times, 2-8 times, 2-9 times, 2-10 times, 2-12 times, 2-13 times, 2-14 times, 2-15 times, 2-16 times, 2-17 times, 2-18 times, 2-19 times, and 2-20 times (and ranges therebetween of any of the foregoing).

Some embodiments (e.g., those above) may include one and/or another (and in some embodiments, a plurality, a majority, substantially all of, or in some embodiments, all) of the following features, functionality, steps, structure, or clarifications, yielding yet further embodiments:
after each enrichment, the method further comprises incubating each dilution at a predetermined temperature for a predetermined amount of time;
after incubation, testing each sample for presence of at least one food pathogen, producing a result;
the at least one food pathogen or microbes (such terms being used interchangeably herein) comprises at least one of *Salmonella, Campylobacter, E. coli, Listeria,* and *Clostridium perfringens*
a result is proportional to the dilution of a last positive test (i.e., a pathogen count is greater than a predetermined amount);
testing is performed on an assay system;
testing is performed on a ferrofluidic based assay system;
testing is performed on a cartridge based assay system;
testing is performed on a ferrofluidic, cartridge based assay system;
after enrichment (and in some embodiments, incubation) of each individual dilution, the method further comprises at least one of (and in some embodiments, a plurality of, a majority of, substantially all of, or in some embodiments, all of):
processing each sample with an assay system (e.g., according to at least one of the assay processing embodiments disclosed in the incorporated by reference patents, PCT publications, and PCT application);
processing each sample with an assay system using a single "lane" of a cartridge, of a cartridge based assay system (e.g., according to at least one of the assay processing embodiments disclosed in the incorporated by reference patents, PCT publications, and PCT application), or in some embodiments, a plurality of lanes;
combining the processed samples of each individual dilution to produce a combined sample; and
processing the combined sample with an assay system (e.g., according to at least one of the assay processing embodiments disclosed in the incorporated by reference patents, PCT publications, and PCT application);
a combined sample is tested via a cartridge based assay system having at least one lane with a plurality of unique capture zones configured to capture labeled cells from each dilution;
using a result from at least a last two positive dilutions to determine an MPN value;
using a result from at least a last positive dilution to determine an MPN value;
a calibrated assay system for use with a method (according to some embodiments) includes standard test information or a curve(s) generated from an enrichment of food samples having known measured CFUs of one or more types of pathogens;
determining a cell concentration by analysis of presence-absence data (i.e., is the pathogen present or not);
the factor comprises between 1:2 to 1:1000 the amount of sample of a previous dilution.
a minimum detected amount is at least one cell or CFU;
applying calibrated assay system counts to last positive dilution sample, processing and averaging the results from duplicate sample sets;
the plurality of dilutions comprise at least three dilutions A, B and C, with dilution factors of 1.000×, 0.010× and 0.001×, respectively;
testing for the presence of at least one food pathogen, and producing a result thereof;
a dilution is positive if the cell count is greater than the assay background;
a dilution is negative if the cell count is less than the assay background;
upon dilutions A, B, and C being positive, assay input is greater than 1 cell×lowest dilution factor;
upon the lowest dilution factor being 1:100 (i.e., 0.01×), assay input is >100 cell;
upon the lowest dilution factor being 1:1000 (i.e., 0.001×), assay input is >1000 cell;
upon the dilutions A and B being positive, and dilution C being negative, assay input is between 1 cell×lowest dilution factor that is positive, and 1 cell×next lowest dilution factor;
upon the lowest positive dilution factor being 1:100 (i.e., 0.01×) and a next lowest dilution factor is 1:1000 (i.e., 0.001×), assay input is between 100 and 1000 cells;

upon the lowest positive dilution factor is 1:100 (i.e., 0.01×) and a next lowest dilution factor is 1:10,000 (i.e., 0.0001×), assay input must be between 100 and 10,000 cells;

upon dilution A being positive and dilutions B and C being negative, assay input is between 1 cell×lowest dilution factor that is positive and 1 cell×next lowest dilution factor; and upon:
the lowest positive dilution factor being the undiluted sample and a next lowest dilution factor is 1:100 (i.e., 0.01×), the assay input is between 1 and 100 cells; or no dilutions being positive, assay input is less than minimum detected amount of 1 cell.

These and other embodiments, objects, advantages, features, functionality, steps, structure, and clarifications of the disclosure will be even more evident with reference to the following details noted below, and accompanying figures, a brief description of which is immediately set out below.

DETAILED DESCRIPTION

Figure 3A:
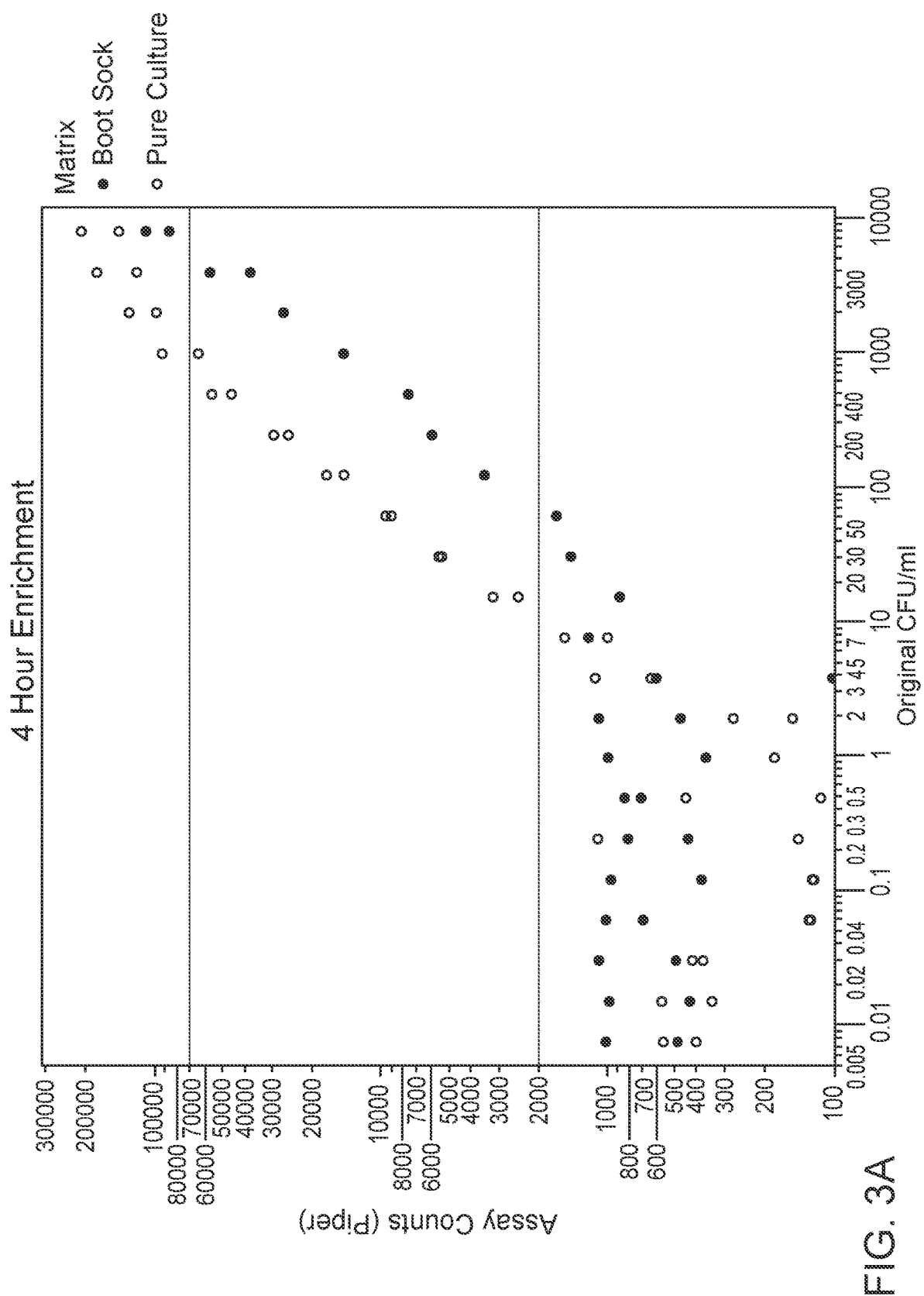
FIG. 3A is a calibration curve obtained for a sample at a first incubation time point, according to some embodiments.
Figure 3B:
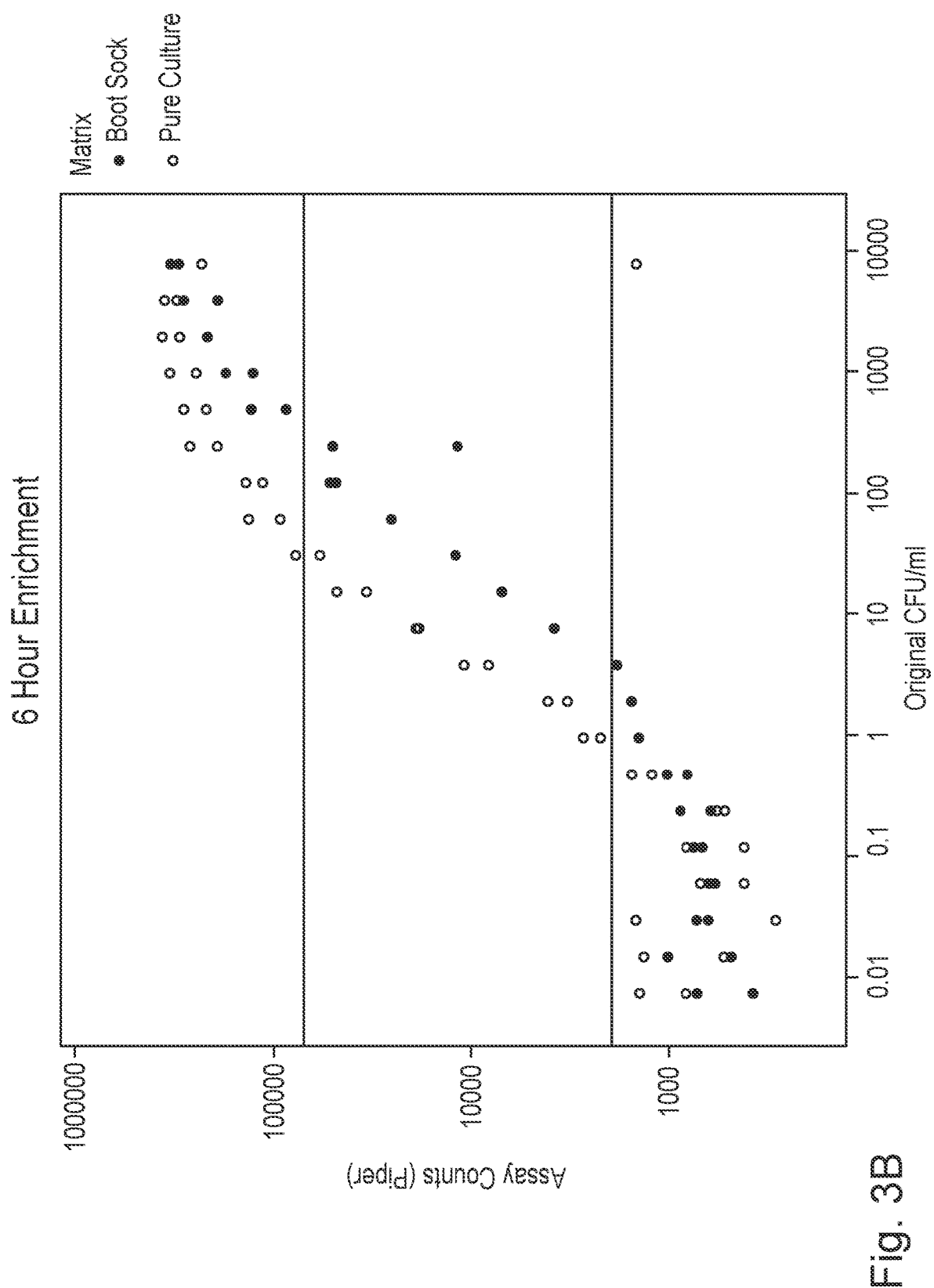
FIG. 3B is a calibration curve obtained for a sample at a second incubation time point, according to some embodiments.

Accordingly, in some embodiments, the accuracy of the MPN when using assay instrumentation (such as PIPER, for example) can be increased by converting counts from the assay instrument to calibrated counts (such a system can be considered a "calibrated assay system" or "calibrated count assay system"). This can be accomplished, according to some embodiments, by pre-loading the assay system (e.g., PIPER) with information on dilutions/MPN with respect to dilutions that have been enriched for a predetermined amount of time; this is shown in the example results shown in FIGS. 3A and 3B. Specifically, serial dilutions (21, 2-fold dilutions) of Salmonella Typhimurium (s. typhimurium) were made in both Romer Rapid Check Salmonella growth media and a boot sock sample that had been prepared in 250 mL of the same media. Final concentrations of cells in each sample were as indicated (in the figures). After dilutions were prepared, they were incubated at 42° C. for 4 hours (Figure A) and 6 hours (Figure B). After incubation, samples, in duplicate, were removed, mixed with ferrofluid (EMG 700), and added to sample wells of a microfluidic cartridge. The cartridges were processed on a PIPER instrument and the captured cells were FISH (fluorescence, in-situ hybridization) labeled using labeling conditions as described in co-pending PCT application no. PCT/US2021/041616. The graphs of FIGS. 3A and 3B show the calibration curves obtained for both samples, pure culture (cells diluted in Rapid Check Media) and in Boot Socks (cells diluted in a prepared boot sock sample), at 2 incubation (enrichment) time points. Average PIPER counts for each dilution of s. typhimurium are shown and the linear range of the assay is shown.

Accordingly, in some embodiments, a standard curve of this type can be used convert the assay system (e.g., PIPER) counts to the actual number of CFUs of salmonella that are present in the last positive dilution of the multi-lane MPN assay. Using this number, plus the actual dilution value for the sample, allows for an accurate determination of the number of CFUs present in a sample. One of skill in the art will appreciate that in the noted example above, the 6 hour graph in FIG. 3B shows increased sensitivity than that of the 4 hour graph in FIG. 3A, indicating that each sample incubation/enrichment time corresponds to a standard curve prepared with the same incubation time. In some embodiments, a similar type of calibration curve can be prepared for assays using combined barcoded enriched sample dilutions that are processed with a multi-zone capture assay microfluidic cartridge (as described in PCT/US2021/041616).

Accordingly, when this approach is used for each sample, the value from at least one last positive dilution (preferably two or more) and the calibrated assay system (e.g., PIPER) count can both be used to provide a more accurate CFU per sample value than would be determined from just the last positive dilution alone. Additional increased accuracy can be obtained by also examining the calibrated count at a next most concentrated sample (if that count in within the calibration range).

To this end, and according to some embodiments, a lower number of dilutions can be performed when compared to a typical MPN method. For example, a 3-tube MPN, corresponding to 3×5 tubes (5 replicates per dilution), results in 15 dilutions/tests in total. However, according to some embodiments of the present disclosure, only 2-5 dilutions, as opposed to 15 dilutions, need be performed to obtain the same MPN result.

Typically, lag times and growth times are the largest variables in allowing single enrichment methods from being quantitative. However, irrespective of growth rate, lag time, cell surface protein, immune-target, or nucleic acid count in cells, methods according to some embodiments of the present disclosure work accurately. Moreover, the number of dilutions and the dilution ratios can be changed to add additional granularity, and/or to provide a broader dynamic range. For example, when analyzing 1-10 dilutions, best accuracy is within 10-fold; when analyzing 1-2 dilutions, the best accuracy is within 2 fold, however, to cover the same range as 1-10 dilutions, more 1-2 dilutions should be performed.

Accordingly, the approach used according to some embodiments, allows for combining a presence-absence assay (i.e., is the pathogen present) with a quantification assay (i.e., how much of the pathogen is present, e.g., how many CFUs are present in a sample), which is not possible even for standard MPN. Moreover, MPN and calibration-based calculations, according to embodiments of the present disclosure, can be automated via the control system of, for example, an assay system (e.g., PIPER). Additionally, in some cases, such methods can be accomplished via a single-lane/channel assay system via, for example, embodiments in the patents, PCT publication, and PCT application incorporated by reference in the present disclosure. The method(s), according to some embodiments described herein, can enable the generation of quantitative results with only one set of enrichments. For example, with PIPER, the method(s) allow for a rapid sensitive determination of presence/absence that can be coupled with use of a calibration curve. Results can be available to the customer within a short period of time (e.g., within 5 to 20 hours from receipt of samples), depending on the length of enrichment.

As an example, and according to some embodiments, glucose pyruvate can be used for resuscitation for nonenrichment quantification, and/or robustness for enrichment based an MPN system for samples that have reached a plateau in enrichment.

Sample Outcome Data via an assay system (e.g., using PIPER and according to some embodiments):
  If assay system counts are >400*, sample should be considered positive;
  If assay system counts are <400*, algorithm should be considered negative;
    Minimum threshold to call a sample positive may vary dependent on the instrument and imaging algorithm
Positive sample=1
Negative sample=0

| Dilution | Outcome #1 | Outcome #2 | Outcome #3 | Outcome #4 |
|---|---|---|---|---|
| A (1×) | 1 | 1 | 1 | 0 |
| B (0.01×) | 1 | 1 | 0 | 0 |
| C (0.001×) | 1 | 0 | 0 | 0 |
| Estimated assay input | >1000 cells | 100-1000 cells | 1-100 cells | <1 cell |

Sample Outcome Calculations (from PIPER and According to Some Embodiments)

Note: Minimum detected amount is ~1 cell
If all 3 dilutions (A, B, C) are positive, assay input should be greater than (1 cell×lowest dilution factor, i.e., volume of stock solution taken divided by the final or total volume of the diluted solution (stock solution+diluent);
  a. If lowest dilution factor is 1:100 (i.e., 0.01×), assay input should be >100 cells (i.e., 1×100);
  b. If lowest dilution factor is 1:1000 (i.e., 0.001×), assay input should be >1000 cells (i.e., 1×1000);
If dilutions A and B are positive (i.e., assay system count greater than 400 see above) but dilution 3 is negative, assay input should be between (1 cell×lowest dilution factor that is positive) and (1 cell×next lowest dilution factor):
  a. If lowest positive dilution factor is 1:100 (i.e., 0.01×) and the next lowest dilution factor is 1:1000 (i.e., 0.001×), assay input should be between 100 (i.e., 1×100) and 1000 (i.e., 1×1000) cells;
  b. If lowest positive dilution factor is 1:100 (i.e., 0.01×) and next lowest dilution factor is 1:10,000 (i.e., 0.0001×), assay input should be between 100 (i.e., 1×100) and 10,000 (i.e., 1×10,000) cells;
If dilution A is positive and dilutions B & C are negative, assay input should be between (1 cell×lowest dilution factor that is positive) and (1 cell×next lowest dilution factor);
  a. If lowest positive dilution factor is the undiluted sample & next lowest dilution factor is 1:100 (i.e., 0.01×), assay input should be between 1 (i.e., 1×1) and 100 (i.e., 1×100) cells;
If no dilutions are positive, assay input should be less than minimum detected amount of 1 cell.

Example

Figure 1:
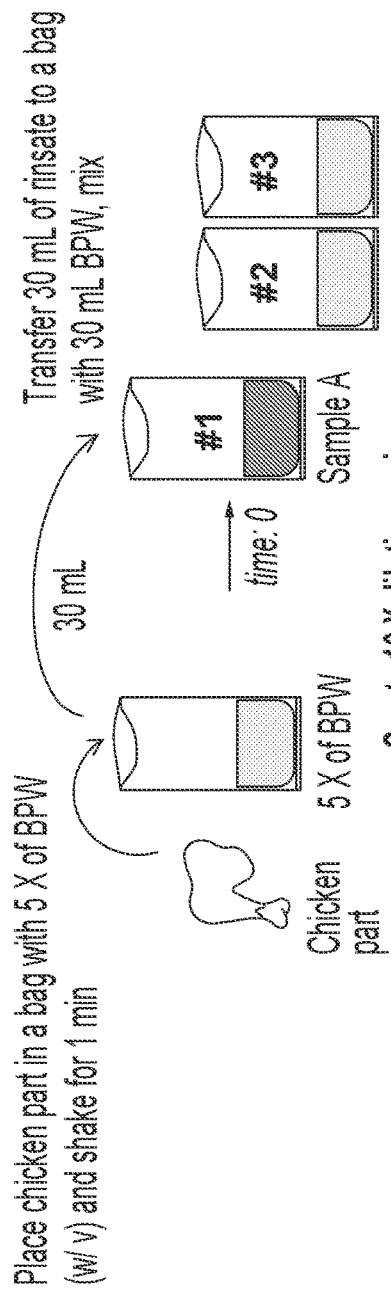
FIG. 1 illustrates a method for processing food samples and performing dilutions for determining MPN according to some embodiments of the disclosure.
Figure 1:
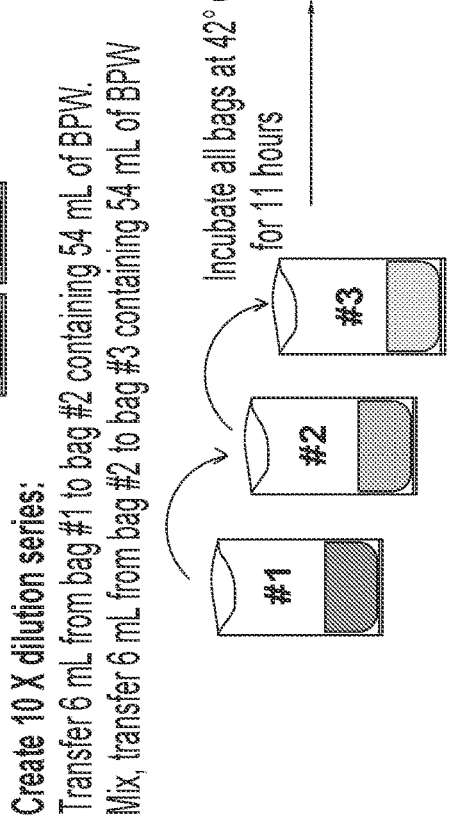
Figure 1:
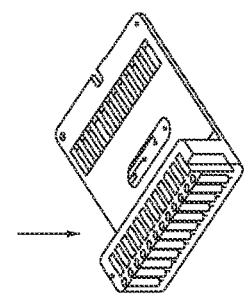

As shown in the process outlined in FIG. 1, aseptically poultry parts were removed from packaging and placed into a 55 oz Whirl-Pak® Homogenizer Blender Filter Bag (Fisher Scientific). A pre-warmed media was added to the bag containing the poultry parts at a ratio of 1 mL of enrichment media to 5 g of poultry (e.g. 100 mL of media per 500 g of chicken parts). The bag was then closed and massaged gently for 1 minute to ensure that all surfaces of the sample were adequately rinsed. Then:
  30 mL of the sample rinse were aseptically transferred into 3, 7 oz, sterile Whirl-Pak bags containing 30 mL of prewarmed media and then labeled A1, B1 and C1.
  Six (6) other sterile Whirl-Pak bags were then filled with 54 mL of media and labeled A2, A3, B2, B3 and C2, C3.
  Three (3) other sterile Whirl-Pak bags were filled with 60 mL of media and labeled D1-3 (media only for control).

Figure 2:
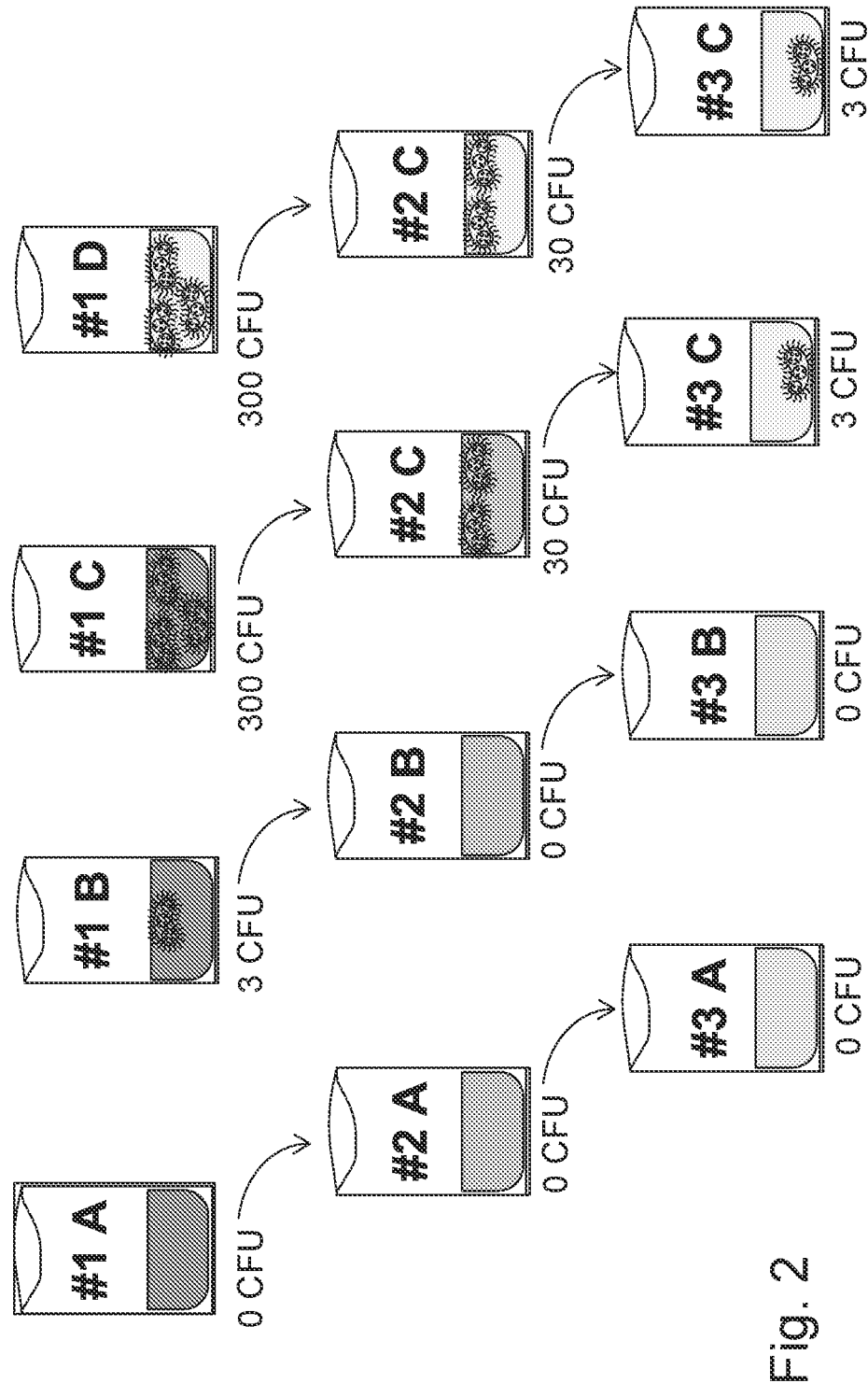
FIG. 2 illustrates dilutions according to four (4) different groups (A1-3, B1-3, C1-3, and D1-3), according to some embodiments of the disclosure.

The bags were then separated into groups A, B, C and D and inoculated according to FIG. 2, and TABLE 1 (below). Specifically, bag A1 was not inoculated, bag B1 was inoculated with 3 CFU, and bags C and D were inoculated with 300 CFU. The first bag of each set (bags #1) were massaged, and then 6 mL of the contents of each (A1, B1, C1, D1) was transferred into the corresponding second bag of each set (A2, B2, C2, D2, respectively). The second bag of each set (bags #2) was then massaged and then 6 mL of the contents of each (A2, B2, C2, D2) was transferred into the corresponding third bag of each set (A3, B3, C3, D3, respectively).

TABLE 1

| Series: | Bag Group A (rinsate contamination control) | Bag Group B (rinsate presence/absence) | Bag Group C (rinsate MPN) | Bag Group D (media only control) |
|---|---|---|---|---|
| Bag/Dilution #1 | 0 CFU | 3 ± 1 CFU | 300 ± 100 CFU | 300 ± 100 CFU |
| Bag/Dilution #2 (10×) | 0 CFU expected | 0 CFU expected | 30 ± 10 CFU expected | 30 ± 10 CFU expected |
| Bag/Dilution #3 (100×) | 0 CFU expected | 0 CFU expected | 3 – 1 CFU expected | 3 – 1 CFU expected |

Bag Group A—control for natural contamination of the rinsate with *Salmonella* initial sample containing 50% poultry rinse.

Bag Group B—simulates MPN with very low levels of contamination.

Bag Group C—simulation of MPN with high levels of contamination.

Bag Group D—no-sample control (optional); comparison of *Salmonella* cell counts post enrichment in groups A, B, C with this series will show if presence of the poultry rinse affects *Salmonella* growth.

Accordingly, Bag #1 of each group comprises an initial dilution, Bag #2 of each group comprises 10× dilution, and Bag #3 of each group comprises 100× dilution.

The samples were then incubated at 42° C. for 11 hours. Thereafter, an aliquot for testing is removed from the third bag of each set.

TABLE 2 illustrates the results of the assay system (PIPER):

TABLE 2

| Series: | Bag Group A (rinsate contamination control) | Bag Group B (rinsate presence/ absence) | Bag Group C (rinsate MPN) | Bag Group D (media only control) |
|---|---|---|---|---|
| Bag/Dilution #1 | 636 ± 43 CFU | 7,892 ± 782 CFU | 88,865 ± 2,942 CFU | 344,669 ± 31,920 CFU |
| Bag/Dilution #2 (10×) | 514 ± 51 CFU | 885 ± 714 CFU | 57,137 ± 2,129 CFU | 143,238 ± 36,985 CFU |
| Bag/Dilution #3 (100×) | 601 ± 222 CFU | 505 ± 147 CFU | 38,807 ± 1,643 CFU | 109,193 ± 7,623 CFU |

From such result counts, counts less than 2,000 were considered negative, and counts greater than 2,000 were considered positive, thus, as shown in TABLE 3:

TABLE 3

| Series: | Bag Group A (rinsate contamination control) | Bag Group B (rinsate presence/ absence) | Bag Group C (rinsate MPN) | Bag Group D (media only control) |
|---|---|---|---|---|
| Bag/Dilution #1 | negative | positive | positive | positive |
| Bag/Dilution #2 (10×) | negative | negative | positive | positive |
| Bag/Dilution #3 (100×) | negative | negative | positive | positive |

With the calculated input in the original samples being: Bag Group A: 0; Bag Group B: 1-10; and Bag Groups C and D: greater than 100.

While various inventive embodiments have been described and illustrated herein, those of ordinary skill in the art will readily envision a variety of other means and/or structures for performing the function, and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, steps, time periods, temperatures (e.g., incubation times and temperatures), and configurations described herein are meant to be merely an example and that the actual parameters, dimensions, materials, steps, time periods, temperatures (e.g., incubation times and temperatures) and configurations will depend upon the specific application or applications for which the inventive teachings is/are used. Those skilled in the art will recognize, or be able to ascertain using no more than routine experimentation, many equivalents to the specific inventive embodiments described herein. It is therefore to be understood that the foregoing embodiments are presented by way of example only and that, within the scope of claims supported by the subject disclosure and equivalents thereto, and inventive embodiments may be practiced otherwise than as specifically described and claimed. Inventive embodiments of the present disclosure are directed to each individual feature, device, system, article, material, kit, step, function/functionality, and method described herein. In addition, any combination of two or more such features, devices, systems, articles, materials, kits, steps, functions/functionality, and methods, if such features, systems, articles, materials, kits, steps, functions/functionality, and methods are not mutually inconsistent, is included within the inventive scope of the present disclosure, and considered embodiments.

Embodiments disclosed herein may also be combined with one or more features, as well as complete systems, devices, and/or methods, to yield yet other embodiments and inventions. Moreover, some embodiments, may be distinguishable from the prior art by specifically lacking one and/or another feature disclosed in the particular prior art reference(s); i.e., claims to some embodiments may be distinguishable from the prior art by including one or more negative limitations.

Also, as noted, various inventive concepts may be embodied as one or more methods, of which one or more examples have been provided. The acts performed as part of the method(s) may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The terms "can" and "may" are used interchangeably in the present disclosure, and indicate that the referred to element, component, structure, function, functionality, objective, advantage, operation, step, process, timing, amount, apparatus, system, device, result, or clarification, has the ability to be used, included, or produced, or otherwise stand for the proposition indicated in the statement for which the term is used (or referred to).

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is currently claimed:

1. A method for quantifying a number of pathogens or microbes present in a food sample in a microfluidic based assay, comprising:
   providing the food sample;
   establishing a first dilution of the food sample by adding a first volume of growth media;
   serially diluting the first dilution at least one additional time to provide one or more subsequent dilutions;
   enriching the food sample after each dilution to provide an enriched sample, wherein the enriching comprises incubating each of the one or more subsequent dilutions at a predetermined temperature for a predetermined amount of time;
   processing the enriched sample with a dilution specific barcoded label; combining a set of barcode labeled dilutions that originated from the food sample to produce a combined sample; and
processing the combined sample to detect the dilution specific barcoded labels and determine the last positive dilution in that set of combined dilutions; and
   quantifying the number of pathogens or microbes present based on the last positive dilution in the set of combined dilutions to thereby quantify the number of pathogens or microbes present in the food sample,
   wherein the one or more subsequent dilutions are increased by a dilution factor, and such dilutions range from between 1 part sample with 1 part media, to 1 part sample with 1000 parts media.

2. The method of claim 1, wherein the diluting is carried out between 2 and 3 times.

3. The method of claim 1, wherein the diluting is carried out between 2 and 4 times.

4. The method of claim 1, wherein the diluting is carried out between 2 and 5 times.

5. The method of claim 1, wherein the diluting is carried out between 2 and 6 times.

6. The method of claim 1, wherein the diluting is carried out between 2 and 7 times.

7. The method of claim 1, wherein the diluting is carried out between 2 and 8 times.

8. The method of claim 1, wherein the diluting is carried out between 2 and 9 times.

9. The method of claim 1, wherein the diluting is carried out between 2 and 10 times.

10. The method of claim 1, wherein the diluting is carried out between 2 and 11 times.

11. The method of claim 1, wherein the diluting is carried out between 2 and 12 times.

12. The method of claim 1, wherein the diluting is carried out between 2 and 13 times.

13. The method of claim 1, wherein the diluting is carried out between 2 and 14 times.

14. The method of claim 1, wherein the diluting is carried out between 2 and 15 times.

15. The method of claim 1, wherein the diluting is carried out between 2 and 20 times.

16. The method of claim 1, wherein processing the combined sample to detect the dilution specific barcoded labels is performed via a cartridge based assay system.

17. The method of claim 16, wherein the cartridge based assay system is a ferrofluidic based system.

18. The method of claim 16, wherein the cartridge based assay system comprises at least one lane with a plurality of unique capture zones coated with anti-barcodes configured to capture cells from each dilution according to a specific cell type.

19. The method of claim 1, wherein the quantifying comprises determining a most-probable-number (MPN) value.

20. The method of claim 16, wherein the cartridge based assay system comprises a calibrated assay system that can be applied to the last positive dilution for determining a cell/CFU concentration.

21. The method of claim 20, wherein the calibrated assay system includes standard test information or curves generated from an enrichment of food samples having known measured CFUs of one or more types of pathogens.

22. The method of claim 2, further comprising determining a cell/CFU concentration range by analysis of presence-absence data.

23. The method of claim 1, wherein the dilution factor comprises between 1:2 to 1:1000 the amount of sample of a previous dilution.

24. The method of claim 1, wherein:
   a minimum detected amount of a pathogen in a dilution is at least one cell or CFU;
   the dilutions comprise at least three dilutions A, B and C, with dilution factors of 1.000×, 0.010× and 0.001×, respectively; and
   when determining the last positive dilution in the set of combined dilutions:

a dilution is positive if the cell count is greater than the assay background;

a dilution is negative if the cell count is less than the assay background;

upon dilutions A, B, and C being positive, assay input is greater than 1 cell×lowest dilution factor;

upon the lowest dilution factor being 1:100 (i.e., 0.01×), assay input is >100 cell;

upon the lowest dilution factor being 1:1000 (i.e., 0.001×), assay input is >1000 cell;

upon the dilutions A and B being positive, and dilution C being negative, assay input is between 1 cell×lowest dilution factor that is positive, and 1 cell×next lowest dilution factor;

upon the lowest positive dilution factor being 1:100 (i.e., 0.01×) and a next lowest dilution factor is 1:1000 (i.e., 0.001×), assay input is between 100 and 10,000 cells;

upon the lowest positive dilution factor is 1:100 (i.e., 0.01×) and a next lowest dilution factor is 1:1000 (i.e., 0.0001×), assay input must be between 100 and 10,000 cells;

upon dilution A being positive and dilutions B and C being negative, assay input is between 1 cell×lowest dilution factor that is positive and 1 cell×next lowest dilution factor;

upon the lowest positive dilution factor being the undiluted sample and a next lowest dilution factor is 1:100 (i.e., 0.01×), the assay input is between 1 and 100 cells; or upon no dilutions being positive, assay input is less than minimum detected amount of 1 cell.

25. The method of claim 16, further comprising combining the enriched sample with a ferrofluid to provide a ferrofluidic sample and providing the ferrofluidic sample in the microfluidic cartridge-based assay system.

26. The method of claim 18, further comprising labeling the cells for fluorescence detection with a fluorophore to provide fluorophore labeled cells and detecting and counting the fluorophore labeled cells at the capture zones.

* * * * *